United States Patent [19]
Wetmore

[11] Patent Number: 5,975,028
[45] Date of Patent: Nov. 2, 1999

[54] COMFORTABLE ANIMAL RESTRAINT

[75] Inventor: Cynthia Wetmore, Memphis, Tenn.

[73] Assignee: St. Jude Children's Research Hospital, Memphis, Tenn.

[21] Appl. No.: 09/096,553

[22] Filed: Jun. 12, 1998

[51] Int. Cl.[6] .................................................. A01K 29/00
[52] U.S. Cl. ............................................................ 119/814
[58] Field of Search ..................................... 119/814, 907, 119/815, 816, 817, 818; 128/869, 870, 872, 873, 874, 875

[56] References Cited

U.S. PATENT DOCUMENTS

| | | |
|---|---|---|
| 2,471,701 | 5/1949 | Post . |
| 3,150,640 | 9/1964 | Nevitt . |
| 3,224,415 | 12/1965 | Gottfried . |
| 3,286,693 | 11/1966 | Ckarke et al. . |
| 3,933,154 | 1/1976 | Cabansag ................................ 128/134 |
| 4,137,870 | 2/1979 | Cano . |
| 4,979,520 | 12/1990 | Boone, Jr. et al. ...................... 128/870 |
| 5,027,833 | 7/1991 | Calkin ..................................... 128/870 |
| 5,167,160 | 12/1992 | Hall, II . |
| 5,218,928 | 6/1993 | Muck et al. . |
| 5,626,150 | 5/1997 | Johnson et al. .......................... 128/870 |
| 5,819,747 | 10/1998 | Timms ..................................... 128/869 |

*Primary Examiner*—Thomas Price
*Attorney, Agent, or Firm*—Klauber & Jackson

[57] ABSTRACT

The present invention relates to a restraint for an animal that comprises a longitudinally extended sheet and a plurality of individually releasably fastenable flap that are adapted to be disposed over the animal's body. The restraint provides a soft and comfortable feel to the animal and achieves the benefit of securing the animal for treatment, research or mere transportation, while maintaining the animal's composure and reducing stress and unwanted movement. The device is easily constructed and utilized and can be applied to a broad variety of animals, including rabbits, guinea pigs, birds, mice and the like.

7 Claims, 5 Drawing Sheets

COMFORTABLE ANIMAL RESTRAINT

BACKGROUND OF THE INVENTION

1. Field of the Invention

The present invention relates generally to restraining devices for small animals, and particularly to a restraint for an animal such as a rabbit that is being used as a test subject, and that must be desirably restrained during the gathering of sample tissues or fluids in accordance with the test protocol, which affords comfort and security to the animal during such procedures.

2. Description of the Prior Art

In the course of conducting medical research, various small animals are engaged for purposes of testing particular potential therapeutic agents for their effectiveness. Usually, such animals are caused to ingest or otherwise receive the agent or device under test and are maintained in the test environment for a clinically significant period of time, after which tissues or fluids may be withdrawn for analysis, to determine from the results of the test the efficacy of the agent or device under investigation. In many instances, the animals under test are rabbits and the mode for the withdrawal of tissue samples or blood are via the ears of the animal. As such procedures are themselves disquieting to the animal test subject, it is desirable to maintain the animal in a secure and stable restraint so that the procedure can be performed with minimum injury and concomitant maximum efficiency.

Prior art devices for restraining animals have employed a variety of means, including cages and like containers where the animals are held rigidly in position. Such cages are usually constructed of metal or like rigid materials so that they are able to withstand both the stresses of movement of the animal during confinement and the conditions that are desirable for the cleaning and sterilization of the device before reuse. The devices in question offer hard surfaces and are extremely uncomfortable and stressful to the animal.

Several means have been disclosed in the prior art for restraining animals for a variety of purposes. For example, U.S. Pat. No. 4,137,870 to Cano discloses a device for the restraint and transport of an animal such as a dog. The device in question covers the torso of the animal however leaves the head and neck totally free. This does not serve to assist in the restraint, stabilization and quieting of the animal as is necessary in the instance where a blood sample or the like is to be withdrawn from the animal's ear. Further, U.S. Pat. No. 5,218,929 to Muck et al. shows a restraint for a bird which has as its object to prevent the bird from taking flight during examination or other similar activities. This device, likewise, fails to address the issues presently of interest, regarding the stabilization of the entire body of the animal and particularly the head and neck of the animal, so that specific parts may be accessed without injury and mishap. Likewise, U.S. Pat. No. 2,471,701 to Post discloses a poultry bag which, like the devices just reviewed, fails to provide the type of stabilization that is desirable for instances where specific body parts, such as the head and neck region of the animal are to be accessed for the withdrawal of a blood or tissue sample, or for other ministrations to the animal.

In summary, while numerous restraining devices are known and have been employed in the past for the stabilization and containment of animals for a variety of purposes, none has addressed the issues that are presently of interest, regarding the stabilization of an animal such as a rabbit for access to certain body parts or appendages such as the region of the head and particularly, to the ears, as well as the torso areas for administration of injections while keeping the head covered for the animal's security, in a manner which provides for the requisite stabilization and assistance to the researcher, while at the same time providing the most comfortable, quieting and least threatening experience for the animal. It is to the achievement of these objectives that the present invention is accordingly directed.

SUMMARY OF THE INVENTION

In a first aspect, the present invention relates to a restraint for an animal such as a research test subject which permits the protrusion and consequent ready accessibility of one or more of the animal appendages, such as the legs, tail or the ears of the animal to a research or veterinary professional, while affording significant improvement in comfort to the animal undergoing the procedure. More particularly, the restraint is prepared in its entirety from non-rigid material and comprises a longitudinally extended non-rigid sheet means which has a length dimension that corresponds to at least the length dimension of the animal test subject, a plurality of non-rigid flap means that extend transversely of the length dimension of the sheet means and define at least one lateral marginal edge, the flap means adapted to be placed about the animal test subject and to be releasably fastened to each other adjacent the marginal edge. The flap means in turn comprise a plurality of juxtaposed flap pairs that extend laterally from the sheet means and are adapted for releasable fastening engagement with each other. The flap pairs in turn comprise a first major flap pair for disposition and engagement about the torso of the animal test subject and extending substantially the entire length of the torso, a second medial flap pair adapted and sized for disposition and engagement about the neck of the subject, and substantially along the entire length of the neck, and a third frontal flap pair adapted for disposition and engagement about the head and nose of the subject. All of the flap pairs are sized and positioned relative to each other to permit the protrusion therebetween of the appendages, tail and/or ears of the animal when the respective flaps are all engaged with each other and the restraint is fully installed. The restraint further may include a rear flap means that extends longitudinally from the sheet means and is proximal to the first flap pair. The rear flap means is adapted for releasable engagement with at least one of the flaps of the first flap pair to cover and secure the rear end of the animal, and likewise is sized to permit the protrusion of the tail therebetween.

The restraint of the invention includes releasable fastening means which may comprise a VELCRO hook-and-catch releasable attachment strips or pads. Velcro type material may be placed along the broad surfaces of the flaps in proximity to the marginal edges thereof in the instance where the flaps are secured to each other in an overlapping engagement. The invention comprehends the use of VELCRO "hook and catch" strips on both sides of each of the flaps, so that the nature of the overlap is not critical. In a further embodiment, the flaps may be designed to meet with each other at their marginal edges, in which event the fastening means may comprise conventional hook and eye fastening members disposed on such marginal edges for cooperative engagement, or a zipper closure means that is disposed on the respective marginal edges for like fastening. Further, conventional straps with buckles and eyelets or snap fasteners may be located and fastened to the outer surface of the restraint and disposed for respective inclusion with each of the flap pairs. Lastly, cloth ties may likewise be used and applied in such capacity, and the invention is considered to extend to such variant embodiments within its spirit and scope.

The restraint may be prepared from a variety of soft and comfortable materials, including natural and synthetic woven fibers, and may include padding, quilting or like multiple insulative layering. The device may be easily washed as by laundering, so that it is ready for reuse.

The restraint of the present invention affords a far more comfortable and thereby humane environment for the animal while maintaining the stability of the operative portions of the animal's anatomy during the performance of the respective professional, veterinary or research procedure. While the restraint has particular applicability to the research environment, it is to be understood that other uses, both professional and domestic may be possible. Thus, the restraint could be utilized by a veterinary professional in the instance where an animal is being treated, such as a cat, dog, hamster, guinea pig or the like, to gently maintain the animal in a secure position while treatment is administered. Moreover, the use of the restraint may reduce the need for the administration of general anesthesia during medical procedures, and the corresponding risk to the animal's airway. Likewise, a pet owner may need to transport an animal and may wish to do so in a more comfortable environment, and the restraint of the present invention will address this need favorably, as well.

Accordingly, it is a principal object of the present invention to provide a restraint for an animal that affords significant improvements in comfort while maintaining maximal stability and restriction of movement.

It is a further object of the present invention to provide a restraint as aforesaid that enables an individual research or veterinary professional to minister to an animal without the aid of a second individual to aid in its restraint and to prevent injury such as by biting.

It is a further object of the present invention to provide a restraint as aforesaid that is particularly useful in the research environment where blood and tissue samples must be withdrawn in the most humane way possible.

It is a still further object of the present invention to provide a restraint as aforesaid that offers a variety of applications beyond the research and professional environment, including the comfortable transport of, or ministrations to animals so restrained.

Other objects and advantages will become apparent to those skilled in the art from a review of the detailed description which ensues with reference to the following illustrative drawings.

DETAILED DESCRIPTION

In accordance with the present invention the foregoing objects and advantages are readily attained.

Figure 1:
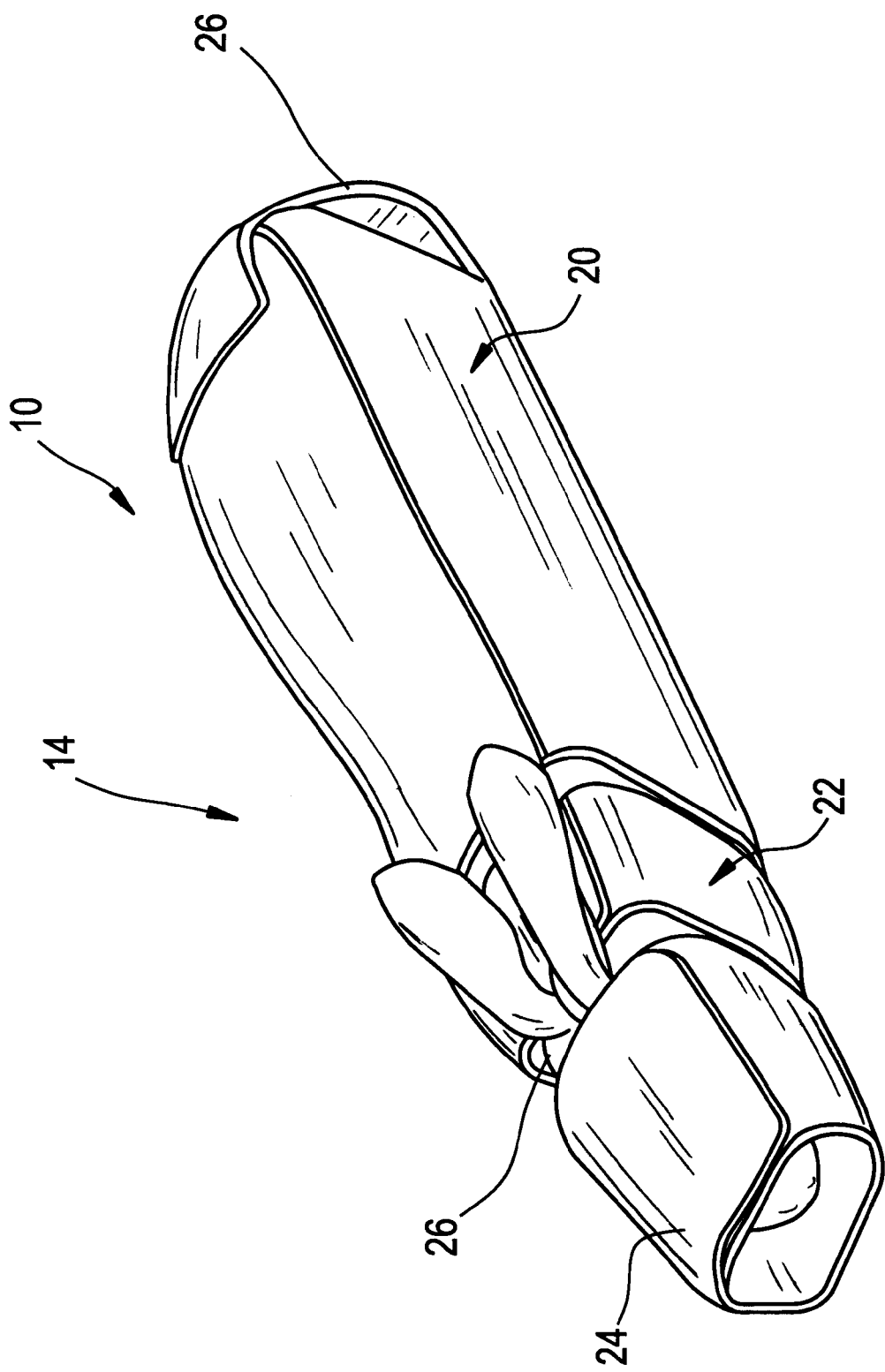
FIG. 1 is a right hand frontal perspective view of the restraint of the present invention illustrated in engagement about the body of a rabbit.

Referring now to the Figures, wherein like numerals designate like parts, and particularly with reference to FIG. 1, the restraint of the present invention is shown generally at 10 and comprises the longitudinally extended non-rigid sheet means 12 that extends as shown at least the entire length of the animal being contained. A flap may also be incorporated for access to a particular region of the torso of the animal, as for injections while securing the fore and hind legs with rostral and caudal flaps. Thus, for example, animal 14 is disposed securely within restraint 10 and sheet means 12 is seen to extend the entire length of the animal.

Figure 2:
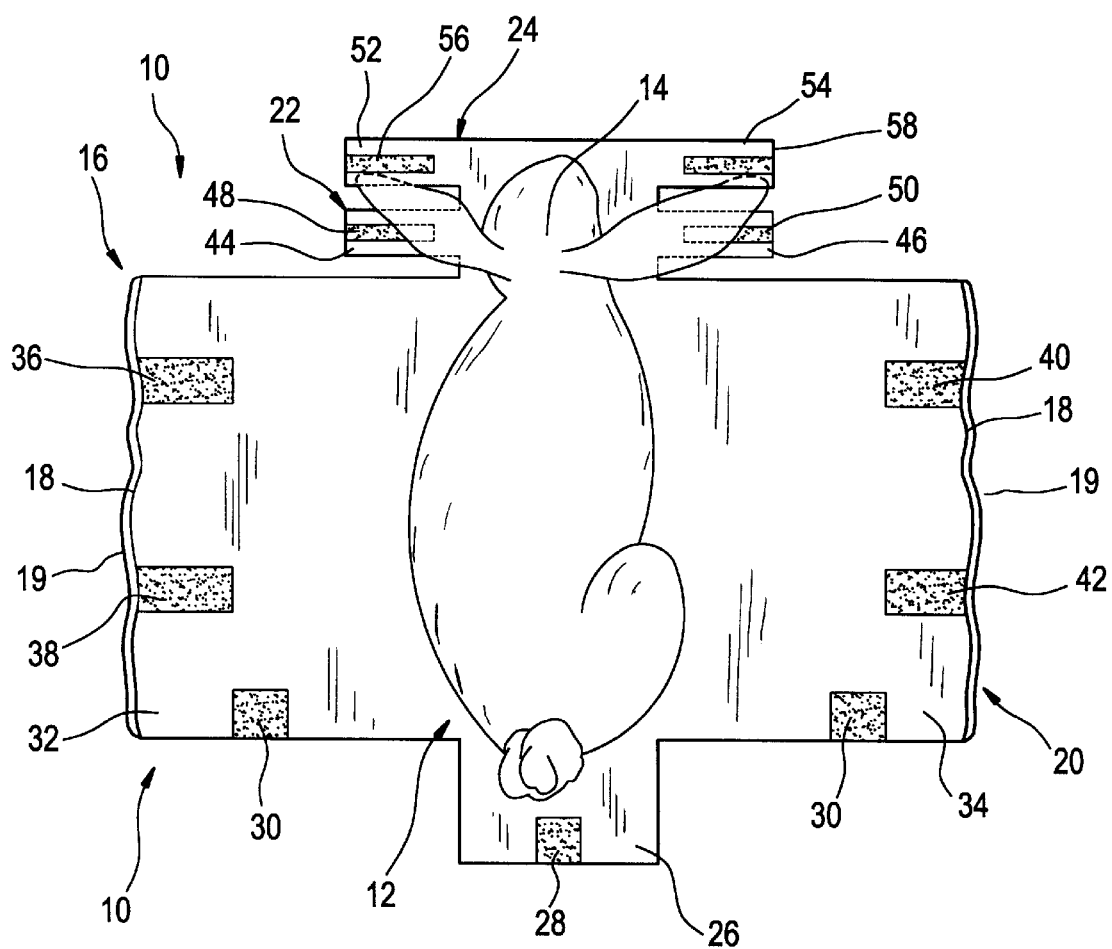
FIG. 2 is a top elevational plan view showing a representative restraint of the present invention in the flat and disengaged position with the animal shown disposed thereon.

Referring now to FIG. 2, restraint 10 is seen to comprise a plurality of non-rigid flap means 16 which extend laterally and transversely to the length dimension of sheet means 12.

Figure 3:
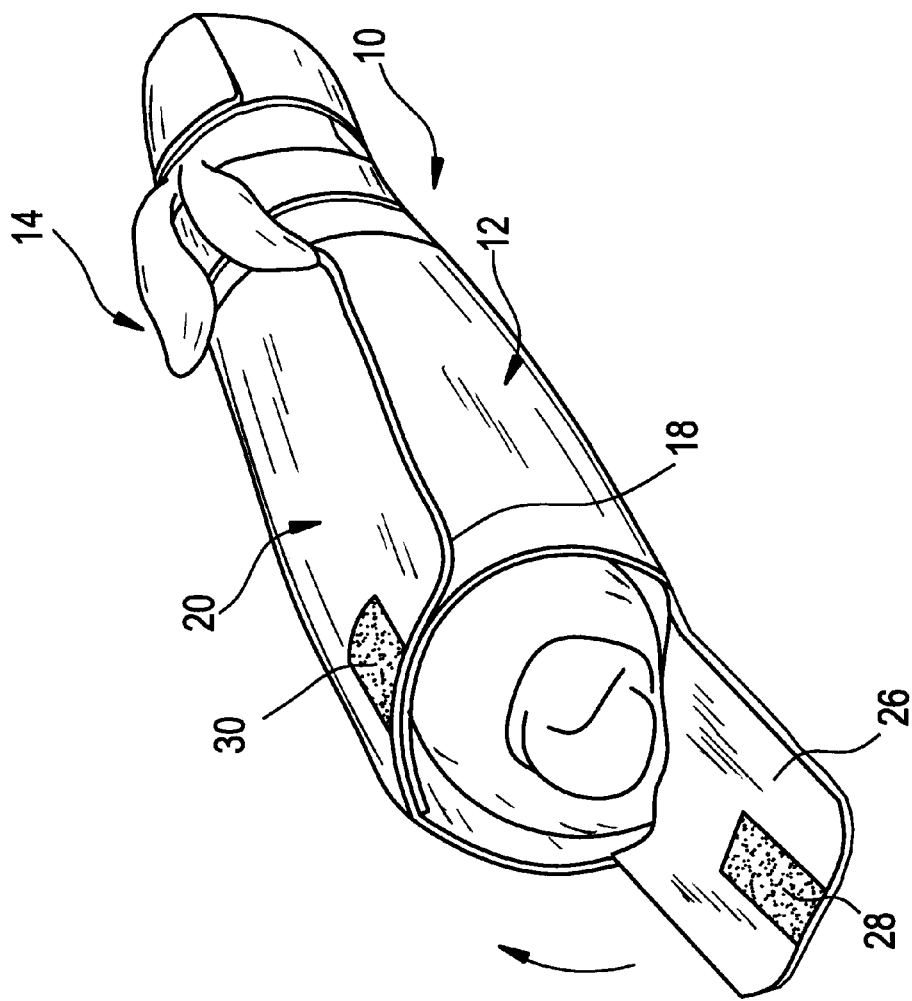
FIG. 3 is a rear perspective view similar to that of FIG. 1, illustrating the restraint of the present invention with the rear flap means shown open and an arrow indicating the direction of movement for securement to the major flap pair for complete closure of the rear quarters of the restraint.

The flap means in turn are provided with at least one marginal edge 18. The flap means as indicated are adapted to be wrapped around or otherwise disposed about the body of the animal to secure the animal as illustrated in FIG. 1. The flap means 16, in turn, comprise a plurality of juxtaposed flap pairs that extend laterally from the sheet means 12. The flap pairs comprise a first major flap pair 20 which as illustrated is adapted for disposition and engagement about the torso of the animal 14 and along substantially the entire length of the torso. A second or medial flap pair 22 is illustrated and disposed adjacent to major flap pair 20 and is adapted for disposition and engagement about and along substantially the entire length of the neck of the animal 14. A third or frontal flap pair 24 is also shown forward of the medial flap pair 22. Frontal flap pair 24 is adapted for engagement and disposition about the head and nose of the animal. Flap pairs 22 and 24 define between them a slot or opening 26 through which the ears are permitted to protrude as shown in FIGS. 1 and 3. In this way, for example, the ears of the animal 14 are available for any procedures or inspection that may be desired, while the remainder of the animal's anatomy is adequately and comfortably restrained. Likewise, the spaces defined between other of the flap pairs, and the major flap pair and the rear flap means, enable the protrusion of other portions or appendages of the animal's anatomy, for examination or treatment in isolation while the remainder of the anatomy is secured.

Referring further to the figures and particularly to FIG. 3, restraint 10 further includes a rear flap means 26 extends longitudinally and rearwardly from the sheet means 12. Rear flap means 26 is located proximal and adjacent to the first flap pair 20 and is adapted for releasable engagement therewith so as to cover and secure the rear end of the animal 14. As illustrated in FIG. 3, flap means 26 is shown in the open position but as indicated by the action arrow, can be folded upwardly and into engagement with a marginal edge of the major flap pair 20. A variety of sequences and fastening procedures are possible, as will be discussed hereinbelow.

Figure 4:
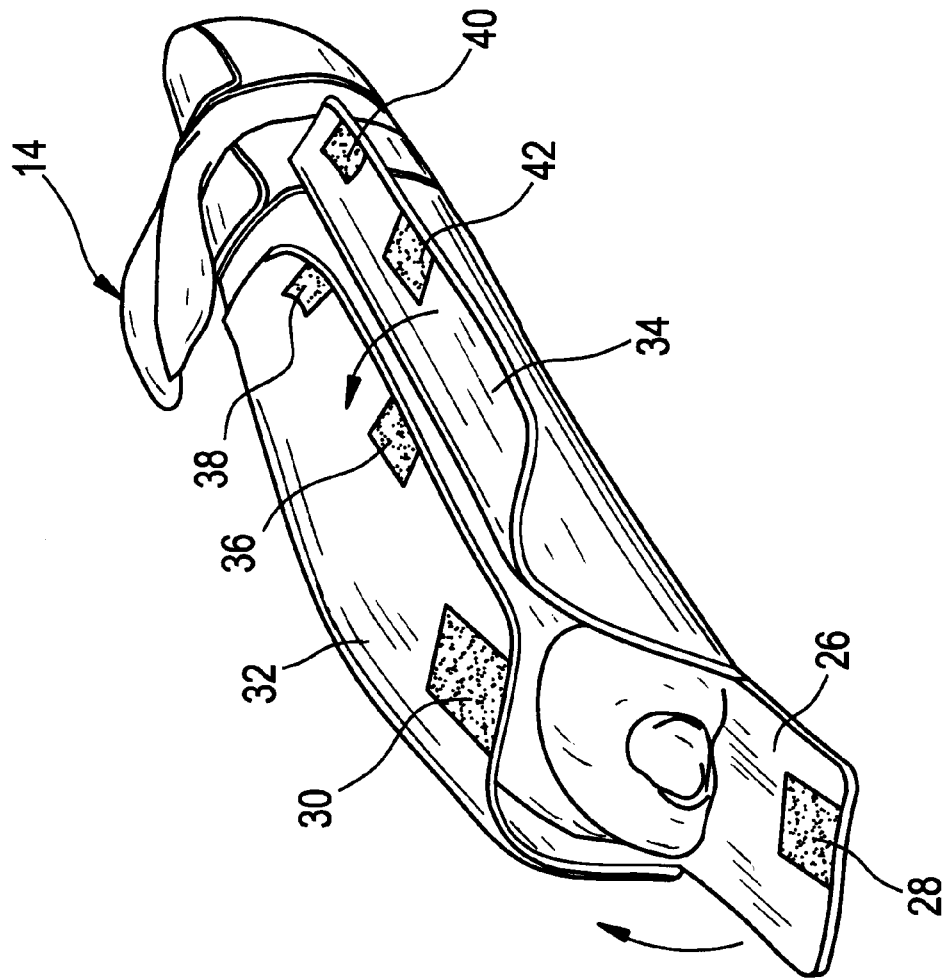
FIG. 4 is a rear perspective view similar to FIG. 3, illustrating the assembly of the restraint in accordance with an alternate embodiment of the invention.

Accordingly, FIG. 4 illustrates a particular configuration for the rear flap 26, where the rear flap 26 is adapted to fold sequentially whereby it is interleaved with the respective flaps of the major flap pair 20. By way of non-limiting example, VELCRO "hook and catch" strips 28 and 30 may be disposed on the surfaces of rear flap means 26 and first major flap 32 so that when rear flap means 26 is folded upward into contact with first major flap 32, VELCRO "hook and catch" strips 28 and 30 releasably bind to each other. In the assembly of the restraint 10, second major flap 34 may then be folded over first major flap 32 as shown by the action arrow in FIG. 4, and will thereby secure the entire torso and rear of the animal within restraint 10.

As discussed earlier, the restraint of the present invention may be secured by a variety of fastening means, including VELCRO "hook and catch" strips as illustrated in the Figures. Turning now to FIG. 2, major flaps 32 and 34 are shown to have velcro strips 36, 38, 40 and 42. Medial flap pair 22, comprising first medial flap 44 and second medial flap 46 may likewise have fastening strips 48 and 50, respectively. Lastly, frontal flap pair 24 comprises first frontal flap 52 and second frontal flap 54, and each may have a respective fastening strip 56 and 58. As shown, the strips are disposed about the marginal edges 18 of the respective flaps so that the ends of the laps may be secured when the restraint 10 is fully wrapped around the animal. While VELCRO "hook and catch" strips are illustrated herein, it is understood that alternative devices such as hook and eyelet means, snaps and catches and other like releasable fastening devices well known in the clothing and luggage arts may be utilized. Simple rope ties associated with the flaps and corresponding to strings may be fastened to the outer surfaces of the flaps so that when the flaps are positioned over the animal, the ties may merely be knotted in releasable fashion as well known to secure the animal within the restraint. Alternately, restraint 10 may be prepared so that the respective ends of the flaps are adapted for edge abutment with each other and fastening at that location. In such instance, a zipper type 49 enclosure may be utilized as is frequently found in luggage, flight bags and the like, which would be attached to the marginal edges 18 and would permit, for example, flaps 32 and 34 to be threaded and zipped together. Likewise, flaps 44 and 46, and 52 and 54, could be fastened in a similar fashion or by means of snap fasteners or hook and eye fasteners, not shown. Any of the forms of engagement described may be used in alternation or in combination and all such modifications are to be considered within the scope of the present invention.

As mentioned earlier, the material from which the sheet means 12 and the respective flap means 16 are prepared may vary, and would include, for example, soft cloth material prepared from natural or synthetic woven fibers. Likewise, multi-layered materials such as quilting could be prepared and used which may include both natural and synthetic fibrous or sheet-like outer layers and cotton or other synthetic and resilient filler materials disposed therewithin. Naturally, other materials such as leather or other fiber reinforced materials may be employed to the extent that it is wished to confer strength and durability to the restraint 10. The primary objective, however, is that the surface adjacent the animal's body should be soft and provide some padding so as to convey the level of comfort and security that will assist in the stabilization of the animal when the restraint is applied. The materials that may be utilized in the preparation of the restraint 10 are all well known and are in use in the luggage, apparel and bedding industries, and the invention is intended to include such materials and modifications within its spirit and scope.

In operation, the restraint 10 may be disposed as shown in FIG. 2, and with the animal securely maintained with a single hand, the major flaps 32 and 34 can be engaged with each other, following which the medial and frontal flaps respectively can be fastened. To the extent that the restraint comprehends the extension and exposure of various parts of the anatomy, and not simply the ears as is illustrated in FIGS. 1, 3 and 4, the relevant portion of the animal's body that is to be exposed can be extended between the spaces defined by the respective flaps, or in the instance where a flap is situated which may be opened while the remainder of the restraint is maintained, such flap may be disengaged for exposure of the relevant portion of the animal's body for treatment or inspection.

While the present invention as illustrated depicts three major flap pairs, it is to be understood that multiple flap pairs are contemplated. For example, major flap pair 20 may be comprised of a series of individual flap pairs having width dimensions similar to those of medial and frontal flap pairs 22 and 24 respectively. If for example major flap pair 20 were divided and defined by three individual flap pairs, it would be easy to appreciate that one of the three might be left unfastened if a larger expanse of the animal body required inspection or treatment. Alternately, the disposition of spaces between such respective individual flap pairs would, itself, offer access to various portions of the animal's body while all of the flap pairs are maintained secure and in engagement with each other.

Figure 5:
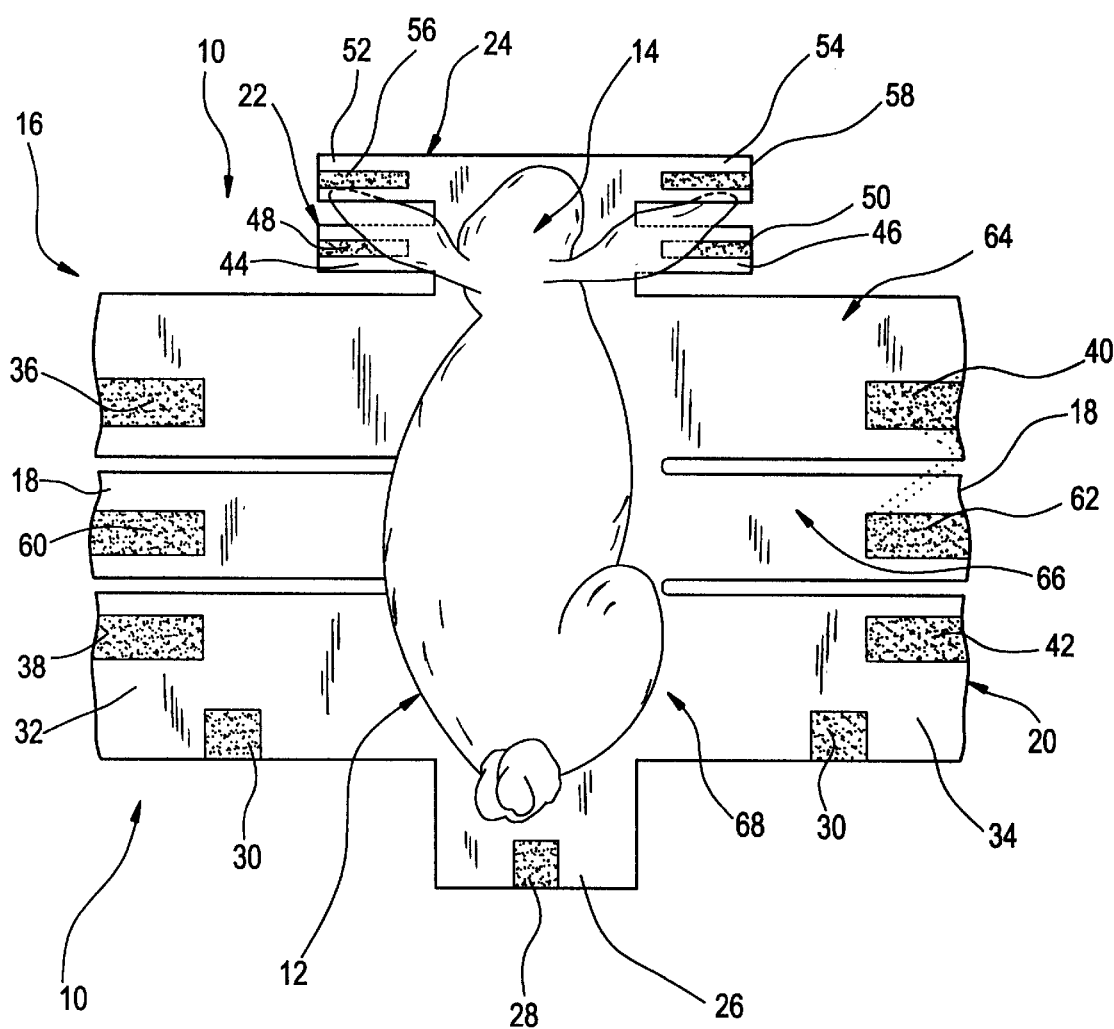
FIG. 5 is a top elevational plan view similar to FIG. 2 showing a restraint in accordance with a further embodiment of the invention.

In this connection, reference is made to FIG. 5 which illustrates the disposition of major flap pair 20 into three segments, each of which may be provided with individual fastening means. Thus, and with reference to FIG. 5, major flap pair 20 may be divided into a first forward flap pair 64, a second intermediate flap pair 66 and a third posterior flap pair 68. Each of the flap pairs would operate in similar fashion to the flap pairs discussed earlier herein as they could be selectively engaged or left open, or would define between them sufficient space as described above, for inspection and access to the body of the animal. Intermediate flap pair 66 is fitted with fastening means 60 and 62 which operate in similar fashion to the other fastening means described hereinabove, so that the individual flap pair may be fastened independently.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A restraint for an animal test subject that permits the protrusion and access of one or more of the appendages of said animal, said restraint prepared in its entirety from non-rigid materials and comprising:

A. a longitudinally extended non-rigid sheet means, said sheet means having a length dimension at least the length dimension of said animal;

B. a plurality of non-rigid flap means extending transversely of the length dimension of said sheet means, and defining at least one lateral marginal edge, said flap means adapted to be placed about said animal and to be releasably fastened to each other adjacent said marginal edge;

i. said flap means comprising a plurality of juxtaposed flap pairs extending laterally from said sheet means for releaseable fastening engagement with each other;

ii. said flap pairs comprising:
   a. a first major flap pair for disposition and engagement about the torso of said animal and extending along substantially the entire length of said torso;
   b. a second medial flap pair adapted for disposition and engagement about the neck of said animal and extending along substantially the entire length of said neck;
   c. a third frontal flap pair adapted for disposition and engagement about the head and nose of said animal; and
   d. a rear flap means extending longitudinally from said sheet means and proximal to said first flap pair, said rear flap adapted for releasable engagement with at least one of the flaps of said first flap pair, to cover and secure the rear end of said animal;
   e. all of said flap members positioned to permit the protrusion therebetween of the appendage of said animal adjacent to the space between adjacent flap members when said respective flaps are all engaged with each other and said restraint is fully installed.

2. The restraint of claim 1 including releasable fastening means disposed adjacent the lateral marginal edges of said flap means for securing the individual flaps of said respective flap pairs to each other.

3. The restraint of claim 2 wherein said fastening means comprises at least one VELCRO-type attachment strip located on each flap of a flap pair for engagement with its mating flap.

4. The restraint of claim 3 wherein said flaps are adapted for overlapping engagement with each other, and said velcro-type attachment strips are mounted on adjacent broad surfaces of said flaps proximal to the lateral marginal edges thereof.

5. The restraint of claim 2 wherein said flaps are adapted for engagement by communication with each other along the lateral marginal edges thereof.

6. The restraint of claim 5 wherein said releasable fastening means comprises zipper means associated with said lateral marginal edges.

7. The restraint of claim 5 wherein said releasable fastening means comprises hook and eyelet means disposed on said respecting lateral marginal edges.

* * * * *